United States Patent [19]

McClosky

[11] 4,085,560

[45] Apr. 25, 1978

[54] APPARATUS AND METHOD OF FORMING COVERS FOR FLEXIBLE COMMODITY-CONTAINING PACKAGES

[75] Inventor: Robert B. McClosky, Hope, N.J.

[73] Assignee: Wrap-ade Machine Company, Inc., Clifton, N.J.

[21] Appl. No.: 736,103

[22] Filed: Oct. 27, 1976

[51] Int. Cl.² .................. B65B 41/18; B65B 51/16; B65B 9/02

[52] U.S. Cl. .................................. 53/27; 53/28; 53/170; 53/177; 53/180 R; 93/20; 156/290; 156/554

[58] Field of Search ............... 53/27, 28, 177, 179, 53/170, 171, 173, 180 R; 93/19, 20, 82, 77 R; 156/260, 290, 512, 554

[56] References Cited

U.S. PATENT DOCUMENTS

| | | | |
|---|---|---|---|
| 2,162,230 | 6/1939 | Salfisberg | 53/180 R X |
| 3,022,613 | 2/1962 | Powers | 53/28 |
| 3,339,337 | 9/1967 | Rapp et al. | 53/180 R |
| 3,868,287 | 2/1975 | Lewyckyj | 156/290 X |

*Primary Examiner*—Travis S. McGehee

[57] ABSTRACT

Method and apparatus for continuously forming covers; particularly covers that are attached to flexible commodity-containing packages. The preferred method of this invention includes the steps of continuously directing at least two webs into overlying relationship with each other; feeding the flexible commodity-containing packages between the overlying webs; pressing overlying webs into engagement with the flexible packages for attaching the webs to the packages to form a composite and severing the composite at spaced-apart intervals to form a plurality of discrete articles which have a cover including sections of the overlying webs. An apparatus for continuously forming the covers also forms a part of this invention.

39 Claims, 6 Drawing Figures

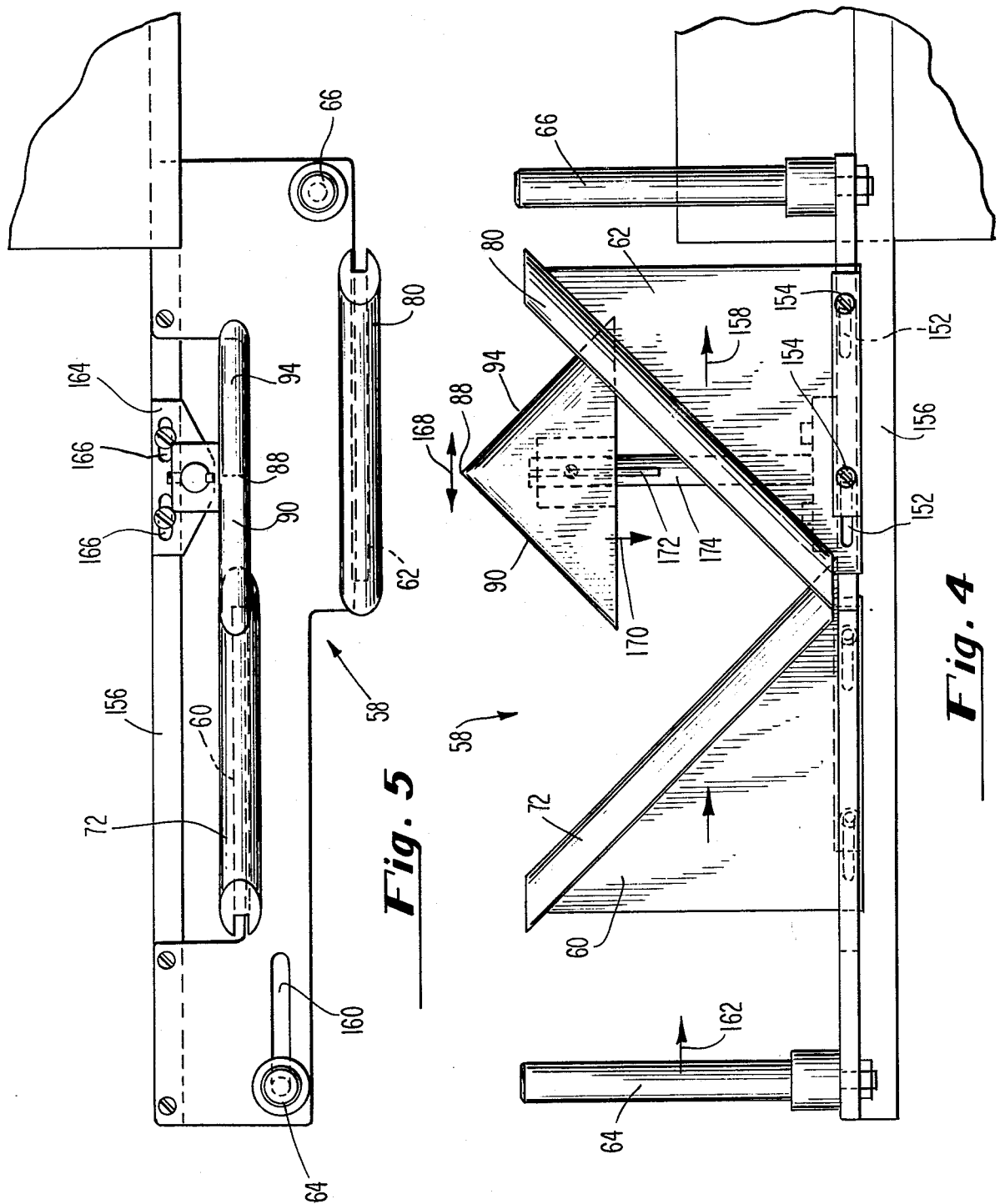

APPARATUS AND METHOD OF FORMING COVERS FOR FLEXIBLE COMMODITY-CONTAINING PACKAGES

BACKGROUND OF THE INVENTION

1. Field of the Invention

This invention relates generally to a packaging method and apparatus, and more specifically, to a packaging method and apparatus for continuously forming covers; particularly covers attached to flexible commodity-containing packages.

2. Description of the Prior Art

Flexible strip packages having commodity-containing compartments for pills, capsules, granular materials and like items, are well known in the prior art. These packages generally include thin flexible walls formed of sheet material, for example, Cellophane, metal foil and the like. Most preferably the sheet material is thermoplastic, and can be softened by heat. Alternatively, the sheet material can include a thermoplastic or adhesive coating to permit juxtaposed layers of said sheet material to be bonded together by the application of heat and pressure, or by the application of pressure alone, to form seals about respective commodity-containing compartments of the package. It is common practice to seal the above-described strip packages within more rigid covers, as disclosed in U.S. Pat. Nos. 2,457,924; 2,325,921; 2,069,332 and 2,069,334. All of the above patents are issued to Leroy L. Salfisberg, who pioneered much of the early work in this area. The covers for the flexible packages protect the packages against damage, provide rigidity for aiding in displaying the packages and provide a carrier for identifying indicia, such as the name of the product, the ingredients of the product, the dosage requirements, etc.

A preferred cover construction is disclosed in U.S. Pat. No. 2,457,924. That cover is generally in the form of a matchbook, and includes a back panel positioned on one side of the flexible package, a front panel overlying the opposite side of the package and a catch strip overlying a free marginal end of the front panel for retaining said front panel in a closed position. The flexible strip package is generally sealed to inwardly facing surfaces of the back panel and the catch strip. In the prior art methods of forming a matchbook-type cover, a single strip of material generally is folded to form the front and back panels, as well as the catch strip. The flexible commodity-containing package is then manually fed between the catch strip and the back panel of each cover, and is sealed by a manual operation; generally with the aid of a hand-crimping tool. This prior art method of forming covered strip packages is quite slow; thereby resulting in undesirably high production costs.

Another type of protective cover suggested in the prior art includes only front and back panels, or leaves, and its construction is similar to a book cover. Most commonly, this type of package is formed by folding a single web of material along a medial line. Sections of the web on opposite sides of the fold-line constitute the front and back panels of the cover. The medial line provides a junction between the panels, and the flexible package generally includes a sealing strip that is heat-sealed to both panels at the fold junction.

U.S. Pat. No. 2,245,827 disclosed an apparatus for continuously forming flexible commodity-containing packages, filling the packages as they are being formed, and thereafter sealing the packages within a cover of the type having front and back leaves. Each cover is formed from a separate sheet which is fed intermittently from a stack into an assembly zone. In the assembly zone, the package is bonded to the sheet, and the sheet is folded into a cover. This intermittent process of forming a protective cover about each flexible package is generally quite slow, and therefore undesirably enhances the production cost of forming covered packages.

Flexible commodity-containing packages for pills, capsules, granulated material and similar commodities have been formed from continuous webs of material in a continuous processing operation, as exemplified by the disclosures in U.S. Pat. Nos. 2,162,230, issued to Salfisberg; 2,468,517, issued to Salfisberg and 3,451,187, issued to Massey et al. In the continuous formation of these flexible commodity-containing packages, it has also been suggested to form opposed walls from two continuous webs cut from a single roll of sheet material, e.g. U.S. Pat. Nos. 2,162,230 and 3,451,187.

Although it has been suggested to form flexible commodity-containing packages in a continuous process, there has been no suggestion, to applicant's knowledge, of continuously forming protective covers for these packages, or continuously attaching the covers to the packages.

SUMMARY OF THE INVENTION

This invention resides in a method and an apparatus for continuously forming covers; particularly covers attached to flexible commodity-containing strip packages. The method of continuously forming the covers attached to the flexible packages includes the steps of directing at least two continuous webs into overlying relationship with each other; feeding flexible commodity-containing strip packages between the two continuous webs; pressing the two webs into engagement with flexible walls of the strip packages for attaching the webs and packages together to form a composite; continuously feeding the composite to a separating station and, at the separating station, severing the composite into discrete articles. Each of the articles includes a flexible commodity-containing package attached to a protective cover that includes web sections separated from the two overlying continuous webs.

In the most preferred embodiment of this invention, three continuous webs are employed to form a cover having the general configuration of a matchbook. One of the webs is employed to form back panels of the package, a second web is employed to form front panels of the package and a third web, which is considerably narrower than the second web, is employed to form catch strips. In the completed article the catch strip overlies a free margin of the front panel to hold said front panel in a closed condition. The force of the catch strip holding the front panel closed can be manually defeated in an easy manner. This permits the front panel to be easily opened so that access can be had to the contents of the package.

In accordance with the preferred method of this invention, the three webs are continuously directed so that the second and third webs partially overlap each other, and also overlie the same surface of the first web. Flexible commodity-containing strip packages are directed between the webs, with the first web positioned on one side of the packages and the second and third webs positioned on the opposite side of said packages. Preferably, the commodity-containing packages are directed between the above webs in a spaced-apart relationship to each other. Thereafter, margins of the second and third webs are pressed toward margins of the first web to connect the webs together. Preferably, flexible walls of the commodity-containing strip packages are positioned between the margins of the first and third webs that are pressed together, whereby the first and third webs are connected to each other through bonded connections to the strip packages. Generally the strip packages are not positioned between the connected margins of the second and third panels. Therefore, the second and third panels are connected directly to each other through their contacting inner surfaces. Most preferably, the pressing operation is accomplished through heated members, and the flexible walls of the strip packages are thermoplastic to thereby soften and become heat sealed to the margins of the first and third webs. After the continuous webs have been attached to each other, and to the spaced-apart strip packages, the composite is separated at spaced-apart locations between the commodity-containing packages to form discrete articles. Accordingly, each of the discrete articles will include a matchbook-type cover attached to a strip package.

It is within the scope of this invention to continuously form covers without attaching them to commodity-containing strip packages. Accordingly, unless specifically indicated otherwise, all references in the specification and claims to webs or panels being "connected" to each other, or to performing a process step on the webs "to connect" said webs together, include directly attaching the webs or panels to each other through their contacting surfaces, or attaching the webs or panels together through an intermediate material, such as walls of a flexible commodity-containing package.

Most preferably, the three continuous webs employed to form the matchbook-type covers are severed from a single sheet of material, and are thereafter directed into the earlier-described relationship with respect to each other to form the covers. Each of the three webs is directed through a different path length from its point of origin (where it is severed from the continuous sheet) to the point where it is oriented relative to the other webs in proper position for forming the matchbook-type covers. Feeding the webs through different path lengths is dictated by the necessity for orienting the three webs relative to each other, as described above. Severing the webs from a single sheet, and directing them through different path lengths presents a problem in establishing the desired tension on the webs to prevent one or more of said webs from becoming slack, and thereby becoming uncontrolable in the process. In the preferred embodiment of this invention, opposed, positively driven sealing rolls are employed to aid in directing the continuous webs through the process, and to connect the second and third webs to the first web. The sealing rolls engaging the first web are provided with a smaller diameter than the opposed sealing rolls that engage the second and third webs, and all the sealing rolls are driven at the same rotational speed. This arrangement was found to be highly desirable for maintaining the desired balance of tension forces on the webs to eliminate the formation of undesirable slack in one or more of said webs during the continuous process of forming the covers.

This invention also resides in the apparatus for carrying out the methods in accordance with this invention. The preferred arrangement of sealing rolls employed in the apparatus of this invention has already been described. The apparatus further includes a unique arrangement of turning rolls and plates which preferably are adjustable to permit the apparatus to accommodate continuous webs having different widths. Adjustability is also provided to permit the length of web travel to be varied in a manner which permits the various webs to be adjusted relative to each other in the machine-direction of web travel. This type of adjustment is generally necessary when one or more of the webs include identifying indicia on it. When the webs include indicia they must be properly aligned in the machine direction so that the appropriate data appears in the proper location on the covers.

Other objects and advantages of this invention will become apparent by referring to the detailed description which follows, taken in conjunction with the drawings.

BRIEF DESCRIPTION OF THE DRAWINGS

FIG. 4 is a rear elevation view of the guide section employed in the apparatus of this invention;

FIG. 5 is a plan view of the guide section shown in FIG. 4; and

DESCRIPTION OF THE PREFERRED
EMBODIMENTS OF THE INVENTION

Figure 6:
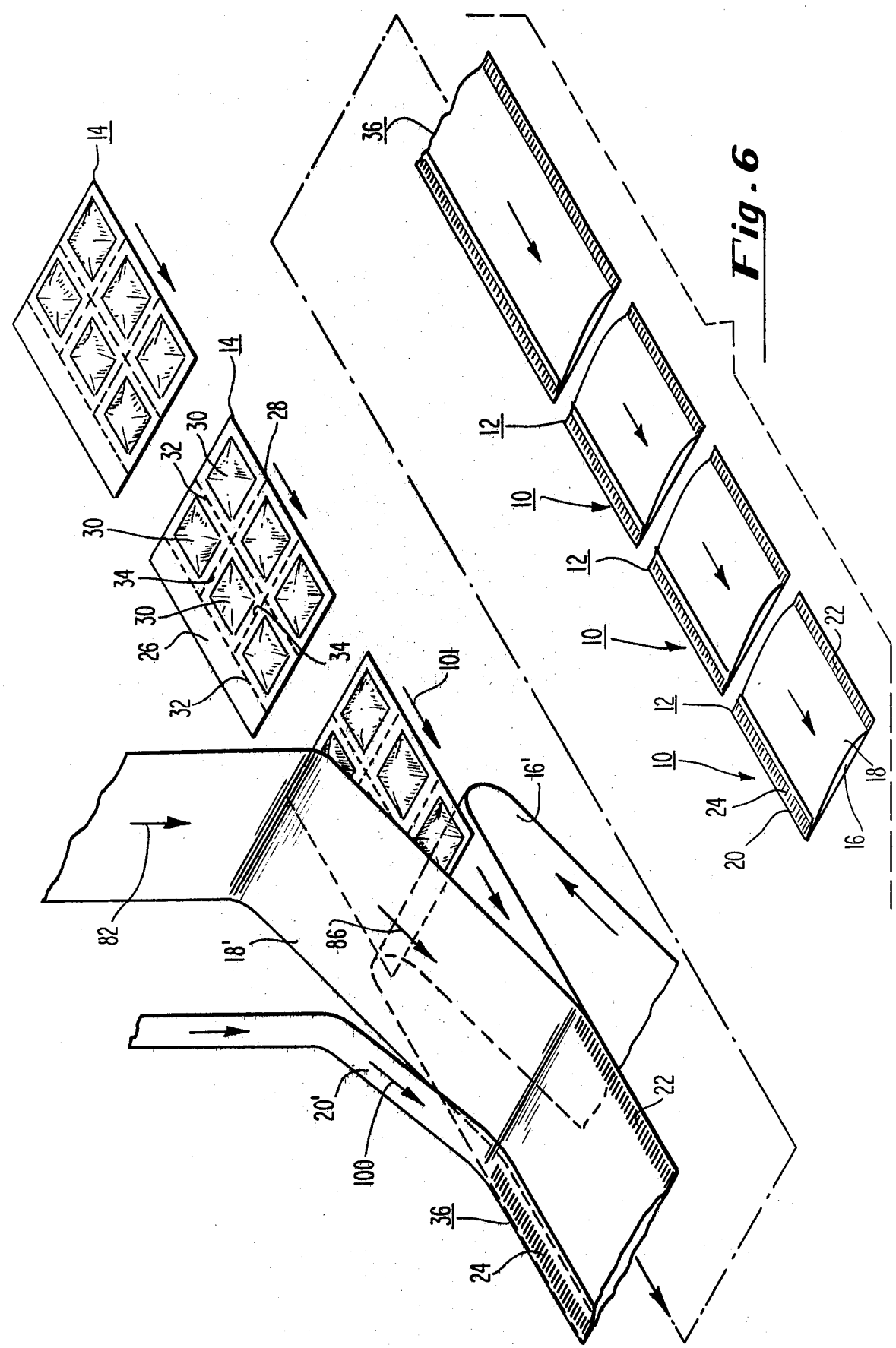
FIG. 6 illustrates the various process steps in accordance with a preferred method of this invention.

The preferred method of forming covered packages 10 of the matchbook-type (herinafter also referred to as catch-cover packages) can best be understood by referring to FIG. 6. The packages 10 are formed in a continuous operation, and each one includes a catch-cover 12 enclosing a flexible commodity-containing strip package 14. The method of forming the strip packages 14 filled with commodities, such as pills, tablets, capsules and the like, does not form a part of the present invention. Apparatus for forming and filling the strip packages are well known in the art, and are commercially available. Representative strip packages are disclosed in U.S. Pat. Nos. 2,468,517 and 2,083,617, both of which are issued to Salfisberg. These patents are incorporated by reference into this application. It should be understood that the strip packages 14 are generally formed as a continuous strip, and severed into the discrete packages shown in FIG. 6 upstream of the catch-cover forming operation.

Still referring to FIG. 6, the catch-cover 12 of each package 10 is formed from three web sections 16, 18 and 20. The web section 16 constitutes the back panel of the cover, and is connected to the web sections 18 and 20 through marginal seals 22 and 24, respectively. The web section 18 constitutes the front panel of the cover 12, and is retained in a closed position by the narrow web section 20 which constitutes a catch strip. Specifically, the catch strip 20 overlies the free end margin of the front panel 18 to maintain said front panel in a closed position, in the same manner as a matchbook cover. The catch can be manually defeated in a fairly easy manner to permit the front panel 18 to be opened so that product can be removed from the strip package 14.

The web sections 16, 18 and 20 of the catch-cover 12 are formed from continuous webs 16', 18' and 20', respectively. These continuous webs preferably are formed from a single sheet in a manner which will be described in detail later. These continuous webs are then directed into overlying relationship with each other, as is shown in FIG. 6. Specifically, the continuous web 18' is directed into overlying relationship with the continuous web 16', while the narrow strip 20' is directed into overlying relationship with both of the continuous webs 16' and 18'. At the same time that the continuous webs 16', 18' and 20' are directed into overlying relationship, the strip packages 14, which are disposed in a spaced-apart relationship, are continuously directed between the overlying webs. Each package 14 includes a marginal strip 26 that is directed between the webs 16' and 20' in position to be bonded to said webs along the marginal seal 24. The opposed marginal end 28 of each package 14 is positioned between the continuous webs 16' and 18', preferably inwardly of the marginal seal 22. Therefore, in the preferred method of this invention, the packages 14 are not bonded to the webs 16' and 18'.

Most preferably, the strip packages 14 are formed from flexible sheets which overlie each other and are bonded together, except in selected areas constituting commodity-containing compartments 30. These compartments are filled with the desired commodities, or articles, in a well known manner. Also, if desired, longitudinal lines of perforations 32 and transverse lines of perforations 34 can be formed in each package 14. These lines of perforations provide weakened regions along which individual articles can be separated from the package.

Most preferably, the flexible sheets from which the packages 14 are formed are thermoplastic, and the marginal strip 26 of each package is bonded to the webs 16' and 20' by the application of heat and pressure to thereby form a composite 36. If desired, the inwardly facing surfaces of the webs 16' and 20' can also include a thermoplastic material to aid in the sealing function. In this latter case, it may be possible to bond the webs 16' and 20' to strip packages 14 formed from non-thermoplastic sheet material. After the composite 36 is formed, it is directed continuously to a cutting station at which the discrete catch-cover packages 10 are separated from said composite.

The continuous webs from which the catch-cover 12 is formed can be of many different materials. Most preferably, these webs are formed of a more rigid material than the flexible sheets employed to form the strip packages 14 in order for the cover 12 to effectively provide a protective function. Generally, a fairly rigid paperboard stock is employed to form the covers 12 for the strip packages 14.

Figure 1:
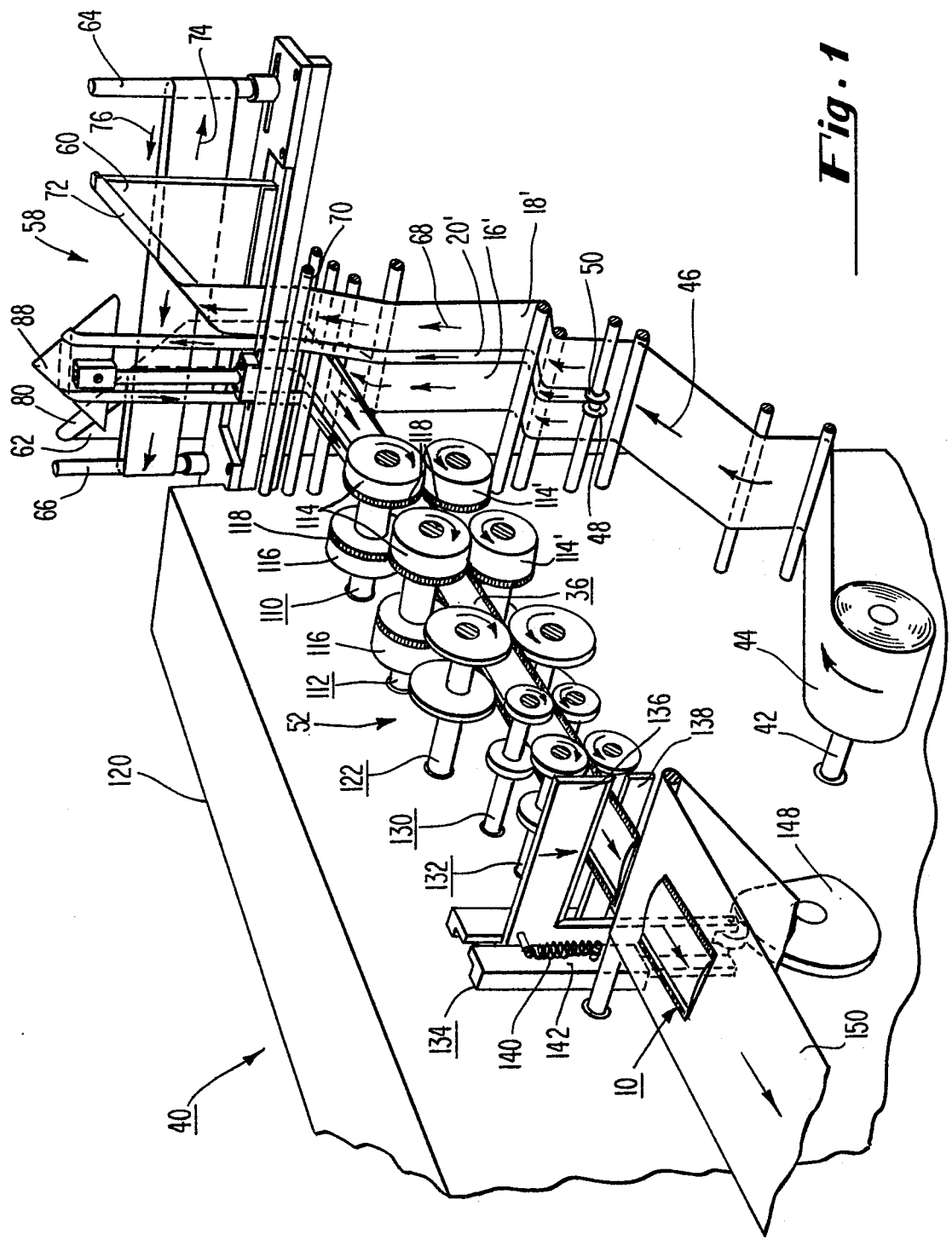
FIG. 1 is an isometric view of the apparatus of this invention, looking from the downstream end thereof.
Figure 2:
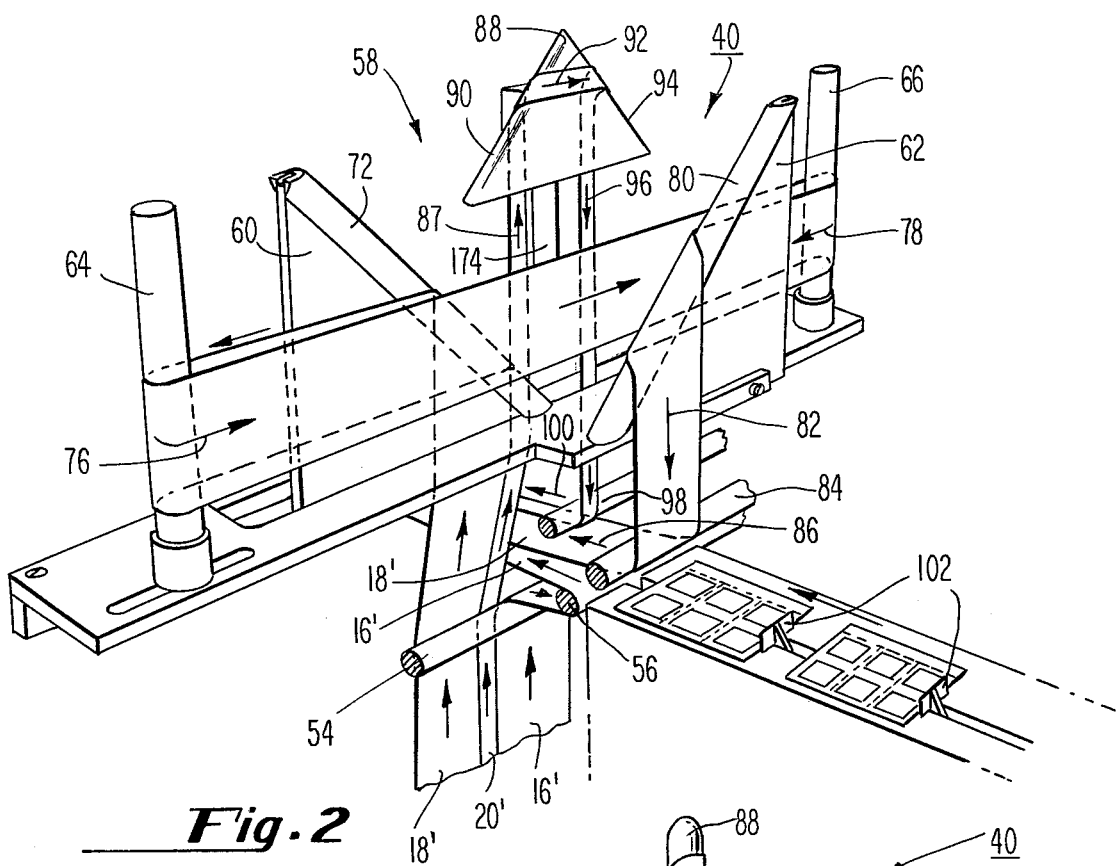
FIG. 2 is an isometric view of a portion of the apparatus shown in FIG. 1, but looking from the upstream end thereof.
Figure 3:
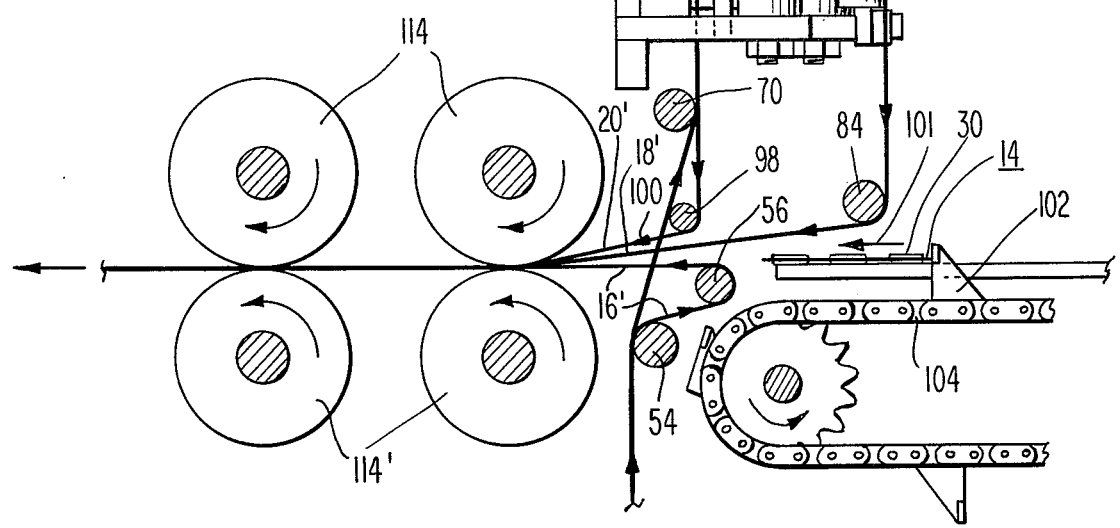
FIG. 3 is a side elevation view of substantially the same portion of the apparatus shown in FIG. 2.

Referring to FIGS. 1-3, an apparatus 40 in accordance with this invention, for carrying out the preferred method illustrated in FIG. 6, will now be described. Referring specifically to FIG. 1, the apparatus 40 includes a spindle 42 for rotatively supporting a roll of sheet material 44; preferably of paperboard stock. The apparatus 40 processes the sheet material 44 to form the catch-covers 12. Specifically, the sheet material 44 is fed in the direction of arrow 46 to a cutter including spaced-apart, circular cutting blades 48 and 50. These cutting blades sever the single sheet 44 into the three separate and continuous webs 16', 18' and 20'. The driving power for continuously moving the webs through the cover forming process is provided by positively driven rolls in a sealing section 52 of the apparatus, as will be explained hereinafter.

Referring to FIGS. 2 and 3, the continuous web 16', from which the back panels 16 are formed, is directed over guide rods 54 and 56 into a generally horizontal plane. The continuous webs 18' and 20' are directed through a guide section 58 that diverts these latter webs into overlying relationship with the continuous web 16'.

Referring to FIGS. 1 and 2, the continuous web 18' is directed through the guide section 58 by spaced web turning plates 60, 62, and transversely spaced, vertically oriented idler rolls 64, 66 to position said web 18' into overlying relationship with the web 16'. Specifically, the web 18' initially is directed in the direction of arrow 68 under idler guide roll 70 and over a turning margin 72 of the turning plate 60. The turning margin 72 is disposed at an angle of 45° to the approach direction of the continuous web 18'. This relationship causes the web 18' to move through an angle of 90°, in the direction of arrow 74, as it is directed over said turning margin 72. The continuous web 18' is then turned 180°, as indicated by arrow 76, about the idler roll 64, and thereafter, through another 180° turn about the idler roll 66, as indicated by arrow 78 (FIG. 2). The web 18' continues to be directed in the direction of arrow 78 about a turning margin 80 of the turning plate 62. The web approaches the turning margin 80 at an angle of 45° in a manner similar to that described in connection with the approach of the web 18' to the turning margin 72. Therefore, the web 18' is again turned through an angle of 90° to be directed downwardly in the direction of arrow 82 (FIG. 2). Thereafter, the web 18' is directed about a guide rod 84 into overlying relationship with the continuous web 16', as indicated by arrow 86 (FIGS. 2, 3 and 6).

Referring to FIGS. 1-3, the continuous web 20' that is employed to form the catch strip 20 is directed under the guide roll 70 in the same manner as the continuous web 18'. However, rather than directing the continuous web 20' to the turning plate 60, it is directed to a turning member 88 in the direction of arrow 89 (FIG. 2). The turning member 88 repositions the continuous strip 20' from its position between the continuous webs 18' and 16' to a position overlying a longitudinal end margin of the continuous web 16' (FIG. 6). Specifically, the continuous web 20' is directed over a turning margin 90 that is disposed at an angle of 45° to the direction that web 20' approaches it. In this manner the web 20' is turned through a 90° angle, causing web 20' to move in the direction of arrow 92 toward a second turning margin 94 of the turning member 88 (FIG. 2). The turning margin 94 is oriented at an angle of 45° to the approach direction (as indicated by arrow 92) of the web 20', and thereby directs said web through a 90° angle into a downwardly moving path indicated by arrow 96. Thereafter, the web is directed about a guide rod 98 (FIGS. 2 and 3) into overlying relationship with both a free marginal edge of the continuous web 18' and a marginal edge of the bottom, continuous web 16', as indicated by arrow 100 in FIGS. 2, 3 and 6.

Referring to FIGS. 2 and 3, the guide rods 84 and 98 are spaced vertically from the guide rod 56 so as to provide a gap between the bottom web 16' and the top webs 18' and 20' as said webs are turned into overlying relationship with each other. The continuous strip packages 14, with commodities packaged therein, are directed in the direction of arrow 101 by pushers 102 connected to a positively driven chain 104. These packages are thereby fed in a spaced-apart relationship to each other into the space, or gap between the bottom web 16' and the upper webs 18' and 20'. In this manner, the spaced-apart strip packages 14 are sandwiched between the upper and lower webs to form an assemblage that is directed into the sealing section 52 of the apparatus.

Referring specifically to FIG. 1, the sealing section 52 includes two sealing stations 110 and 112, respectively. The number of sealing stations employed in this apparatus can be varied. However, there should be enough sealing stations to insure that the webs are connected together. The sealing stations 110 and 112 are of identical construction, and each includes laterally spaced-apart upper sealing rolls 114 and 116 cooperating with laterally spaced-apart lower sealing rolls. Only one of the lower sealing rolls is shown at 114 in each of the sealing stations 110 and 112. Opposed sealing rolls (e.g. 114 and 114') include cooperating knurled surfaces 118 that provide a nip for compressing margins of the web together to form the marginal seals 22 and 24, and thereby form the bonded composite 36 (FIG. 6). Depending upon the material used to form the composite 36, pressure alone, or a combination of heat and pressure, can be employed to form the marginal seals 22 and 24. Heat can be imparted to the sealing rolls by conventional roll heaters (not shown) encased within a housing 120. Conventional drive means (not shown) are retained within the housing 120, and include suitable gears for positively driving the rolls in the sealing stations 110 and 112 at the same rotational speed to aid in feeding the continuous webs 16', 18' and 20' through the apparatus 40.

In the preferred construction of the apparatus 40, the upper sealing rolls 114 and 116 are of a greater diameter than the cooperating lower sealing rolls. This arrangement, accompanied by the fact that the upper and lower sealing rolls are driven at the same rotational speed, balances the tension on the continuous webs to prevent the upper webs 18' and 20' from becoming slack after a relatively short period of continuous operation. If the webs are permitted to become slack, they cannot be properly controlled to form catch-cover packages 10 that meet desired, or required specifications. It was found that by providing the upper sealing rolls with a greater diameter than the lower sealing rolls, and by rotating the sealing rolls at the same rotational speed, the tensions imparted to the continuous webs 16', 18' and 20' could be balanced to maintain proper control over all of said webs during continuous, long-term operation of the apparatus 40. In a preferred embodiment of this invention, the diameter of the upper sealing rolls 114 and 116 is 3.833 inches, whereas the diameter of the lower sealing rolls is 3.812 inches. In other words, the difference in diameters between the upper and lower sealing rolls is only about 0.021 inches. However, this difference provides the desired balance of tension forces to permit long-term operation of the apparatus 40.

After the continuous webs have been sealed to each other, and to the spaced-apart packages 14, the bonded composite 36 is directed to an embossing station 122. This embossing station includes laterally spaced-apart upper and lower discs which cooperate with each other in a manner similar to that of the sealing rolls employed in the stations 110 and 112. The discs can be provided with an engraved surface including any desired data. For example, the surfaces can be encoded to indicate the lot number of the production run, or to indicate other desired information. Most commonly, the identifying data is included on the periphery of only one of the laterally spaced discs, and the other disc is provided to impart a balanced feed of the composite 36. The discs of the embossing station 122 are positively driven by conventional drive means (not shown) contained within the housing 120. It should be understood that the embossing station 122 is optional, and is generally included when it is desired to provide identifying indicia, as explained above.

Referring again to FIG. 1, a pair of draw stations 130 and 132 are provided. These draw stations include laterally spaced sets of driven rolls which are rotated at a faster surface speed than the rolls associated with the sealing stations 110 and 112 and with the embossing station 122. In this manner, tension is maintained on the composite 36 as it is directed to a cutting station 134.

The cutting station 134 includes a guillotine cutter having upper and lower cutting blades 136 and 138, respectively. The guillotine cutter can be intermittently actuated in a conventional manner to sever discrete catch-cover packages 10 from a bonded composite 36 (FIGS. 1 and 6). As shown in FIG. 1, a tension spring 40 can be connected at one end to a fixed guide member 142 in which the upper cutting blade 136 is adapted to reciprocate. The other end of the spring is connected directly to a projection on the upper cutting blade 136 to bias the upper blade toward the lower blade, as indicated by arrow 144. To intermittently operate the cutter a cam follower associated with the upper blade 136 rides on a cam 148 which is designed to maintain said upper blade separated from the lower blade 138 except at the desired cutting intervals. After the discrete catch-cover packages 10 are formed, they can be directed out of the apparatus by a conventional conveyor, such as that indicated at 150 in FIG. 1.

Referring to FIGS. 4 and 5, the various elements of the guide section will be described in greater detail. It is highly desirable to arrange several of the elements in the guide section 58 so that they can be adjusted into different positions. In this manner, the various webs can be adjusted relative to each other both laterally (i.e., in the cross-machine-direction of web travel) and longitudinally (i.e., in the machine-direction of web travel). As explained earlier, the continuous web 18' is moved into overlying relationship with the continuous web 16' by directing said web 18', in seriatim, over the turning plate 60, idler roll 64, idler roll 66 and turning plate 62. As can be seen best in FIG. 4, both the guide plates 60 and 62 are mounted for lateral, or cross-machine-direction adjustment in the same manner. FIG. 4 shows the mounting arrangement most clearly for the turning plate 62. The lower end of the turning plate 62 is provided with laterally elongated slots 152 through which fasteners, such as screws 154, extend. These screws connect the plate 62 to a fixed horizontal frame member 156. The plate 62 can be laterally adjusted by merely loosening the screws 154 and sliding the plate in the direction of 158 to a desired position. The turning plate 60 is adjustable in an identical manner.

By providing lateral adjustability for the turning plates 60 and 62, the lateral, or cross-machine-direction orientation of the continuous web 18' can be adjusted. To further explain, lateral orientation of continuous web 18' is fixed in a single lateral position as it approaches the turning plate 60 from the cutter. This results from the fact that the continuous roll of sheet material 44 generally is fixed against lateral movement on the spindle 42. However, by laterally adjusting either one or both of the turning plates 60, 62 the location at which the continuous web 18' passes over the turning margin 80 of the turning plate 62 can be changed. Causing the continuous web 18' to pass over different locations of the turning margin 80 actually effects a repositioning of the web laterally as it moves in its downward path in the direction of arrow 82 (FIG. 2). This permits adjustment of the lateral position of the web 18' as it is directed into overlying relationship with the web 16'. This lateral adjustment is desirable to permit correction of any cross-machine-direction misalignment which may exist between the overlying webs 18' and 16'. Also, lateral adjustment is desirable to permit the apparatus to be employed to form covers from different width webs.

In some instances the machine-direction orientation of the continuous web 18' may have to be adjusted. This may be necessary when indicia, such as product information, is contained in a repeating fashion on the continuous web 18', and it is necessary to properly align the web in the machine-direction so that the discrete packages 10 severed from the continuous composite 36 contain the necessary product information in the proper location. In order to permit machine-direction adjustment of the continuous web 18' relative to the continuous web 16' the idler roll 64 is mounted for adjustment in elongated slot 160 (FIG. 5). This permits the idler roll 64 to be moved laterally, as indicated by arrow 162 in FIG. 4. Lateral adjustment of the idler roll 64 functions to change the path length of travel of the continuous web 18'. This is accomplished without altering the position at which the continuous web 18' passes over the turning margin 80 of the turning plate 62, assuming that the turning plates 60 or 62 are not moved. Accordingly, the lateral, or cross-machine-direction orientation of the continuous web 18' will not be changed by the lateral adjustment of the idler roll 64. However, since the length of travel of the continuous web 18' is changed, its machine-direction orientation relative to the continuous web 16' is also changed. In this manner, machine-direction alignment of the webs 16' and 18' can be accomplished.

The turning member 88, which is responsible for guiding the path of travel of the continuous catch strip 20', is supported on a base 164 having laterally elongated slots 166 therein (FIG. 5). This permits lateral adjustment of the turning member 88 in the directions indicated by arrow 168 (FIG. 4). A lateral adjustment of the turning member 88 changes the position that the continuous web 20' engages the turning margins 90 and 94. This changes the cross-machine-direction orientation of the web 20' as said web moves downwardly in the direction of arrow 96 (FIG. 2). Accordingly, the lateral adjustability of the base 164 permits cross-machine-direction adjustment of the web 20' relative to the continuous webs 16' and 18'.

The turning member 88 is also adjustable in a vertical direction, as indicated by arrow 170 in FIG. 4. This adjustability is provided by including an elongate, or longitudinally extending slot 172 in a vertical stem member 174 supporting the turning member 88. The turning member is mounted for vertical adjustment in the slot 172 in a conventional manner. The vertical adjustability of the turning member 88 permits changing the machine-direction length of travel of the continuous web 20'; thereby permitting machine-direction alignment, or orientation, of the continuous web 20' relative to the continuous webs 16' and 18'.

In summary, it can be seen that the adjustability provided in the guide section 58 permits a considerable amount of latitude in adjusting the various continuous webs 16', 18' and 20' relative to each other.

It is within the scope of this invention to form the cover from only two continuous webs, as opposed to the three continuous webs employed to form the catchcover 12 in accordance with the preferred embodiment of this invention. In accordance with the modified process and apparatus, the two-blade cutter employed to sever the webs from the continuous sheet 44 is replaced with a single-blade cutter. This latter cutter is employed to sever the continuous sheet 44 into only two continuous webs. One of the webs can be handled in substantially the same manner as web 16', and the other web can be handled in substantially the same manner as web 18'. The guide section 58 can be modified by eliminating the turning member 88, since the modified method and apparatus does not employ a continuous web of material equivalent to that of the narrow strip 20'. The two webs can be directed into overlying relationship, in the same manner as webs 16' and 18', and discrete strip packages 14 can be sandwiched between the continuous webs in the same manner as described above in connection with the most preferred embodiment of the invention. A single marginal seal can be formed to bond overlying margins of the two webs to marginal strips of the strip packages 14, in a manner similar to that in which marginal seal 24 is formed to attach the continuous webs 20' and 16' to the marginal strips 26 of the discrete packages 14. In this manner, the discrete packages are formed with a cover having a front leaf and a back leaf in a manner similar to that of a book cover.

Having described my invention, I claim:

1. A method of continuously forming covers connected to flexible commodity-containing packages, said method comprising the steps of:
   a. continuously directing at least two webs into overlying relationship with each other;
   b. feeding flexible commodity-containing packages between the overlying webs with a margin of the packages being superimposed with a margin of each of the overlying webs;
   c. applying pressure to the superimposed margins of the overlying webs and flexible packages to join together the packages and webs at the superimposed margins to form a composite; and
   d. severing the composite in discrete, spaced-apart sections to form a plurality of discrete packages, each package being joined to a cover member that includes sections of the overlying webs.

2. The method according to claim 1, including the step of applying heat with the pressure to form the composite.

3. The method according to claim 1, including the step of cutting a continuous single sheet into the separate webs that are employed to form the covers.

4. The method according to claim 3, wherein the cutting step is carried out to form, from the continuous single sheet, all of the webs employed to form the covers.

5. The method according to claim 3, including the step of directing the separate webs that are cut from the continuous single sheet through different path lengths from their point of formation from the continuous sheet to the point where they are connected together to form the composite.

6. The method according to claim 1, wherein said at least two webs are more rigid than the flexible commodity-containing packages.

7. A method of continuously forming catch-covers, each including a back panel, a front cover panel connected adjacent a marginal edge thereof to a marginal edge of the back panel, and a catch strip overlapping the opposed marginal edge of the front panel and also connected to the back panel, said method comprising the steps of:
 a. cutting a single continuous sheet to form first, second and third webs;
 b. continuously directing the first, second and third webs into a position in which the first web, from which the back panels are formed, is superimposed with the second and third webs, said second and third webs partially overlapping each other to permit the front panels and catch strips, respectively, to be formed therefrom;
 c. applying pressure to the first and second webs adjacent end margins thereof to connect them together;
 d. balancing the tension on the continuous webs as said webs are directed from the cutting step to the pressure applying step to prevent the webs from becoming undesirably slack; and
 e. severing the composite in discrete, spaced-apart sections to form a plurality of catch-covers, each cover including a back panel formed from a section of the first web, a front panel formed from a section of the second web and a catch strip formed from a section of the third web.

8. The method according to claim 7, including the steps of directing the webs that are cut from the single sheet through different path lengths from their point of formation from the continuous sheet to the point where they are connected together to form the composite.

9. A method of continuously forming catch-covers connected to flexible commodity-containing packages, each catch-cover including a back panel, a front panel and a catch strip, said method comprising the steps of:
 a. continuously directing first, second and third webs into a position in which the first web, from which the back panels are formed, is superimposed with the second and third webs, said second and third webs partially overlapping each other to permit the front panels and catch strips, respectively, to be formed therefrom;
 b. feeding flexible commodity-containing packages between superimposed webs so that the first web is positioned on one side of the packages and the second and third webs are positioned on the opposite side of said packages;
 c. connecting said second and third webs to said first web adjacent marginal ends of said first web, at least one connection being made through a bonded junction including a marginal end of the flexible commodity-containing packages, said connected webs and packages forming a composite; and
 d. severing the composite in discrete, spaced-apart sections to form a plurality of packages, each package being joined to a catch-cover that includes a back panel formed from a section of the first web, a front panel formed from a section of the second web and a catch strip formed from a section of the third web.

10. The method according to claim 9, including the step of connecting the third web to the first web by bonding said first and third webs to the commodity-containing packages.

11. The method according to claim 9, including the steps of cutting a single continuous sheet to form the three webs, and balancing the tension on the continuous webs as said webs are directed from the cutting step to the pressure applying step to prevent the webs from becoming undesirably slack.

12. The method according to claim 11, including the steps of directing the webs that are cut from the single sheet through different path lengths from their point of formation from the continuous sheet to the point where they are connected together to form the composite.

13. The method according to claim 11, wherein said single continuous sheet is more rigid than the flexible commodity-containing packages.

14. The method according to claim 9, wherein said first, second and third webs are more rigid than the flexible commodity-containing packages.

15. An apparatus for continuously forming catch-covers of the type including a back panel, a front panel and a catch strip for retaining the front panel in a closed position overlying the back panel, said apparatus comprising:
 a. cutting means for separating a continuous single sheet into first, second and third continuous webs;
 b. guide means positioned downstream of the cutting means for continuously directing the first, second and third continuous webs into a position in which the first web is superimposed with the second web, and the third web partially overlaps the second web and also is superimposed with the first web;
 c. pressure-applying means for pressing the first and second webs together and the first and third webs together to connect the first and second webs, and the first and third webs adjacent marginal ends thereof to form a composite; and
 d. severing means for separating the composite into discrete sections to form separate catch-covers, each of said covers including a back panel formed from a section of the first web, a front panel formed from a section of the second web and a catch strip formed from a section of the third web.

16. The apparatus according to claim 15, wherein said guide means includes adjustable web-diverting surfaces for permitting adjustment of the cross-machine-position of superimposed webs relative to each other.

17. The apparatus according to claim 15, wherein said guide means includes adjustable web-diverting surfaces for permitting adjustment of both the cross-machine-direction position and the machine-direction position of the superimposed webs relative to each other.

18. The apparatus according to claim 15, wherein said cutting means include laterally spaced-apart cutting blades positioned inwardly of longitudinal end margins of the sheet for severing said continuous sheet into the three continuous webs with the third web being formed between the spaced-apart cutting blades.

19. The apparatus according to claim 15, wherein said guide means includes web-diverting surfaces for directing the continuous webs severed from the single sheet in non-mirror image paths from the point where the single sheet is cut to form the webs to the pressure-applying means.

20. The apparatus according to claim 15, wherein said guide means includes web-diverting surfaces for directing the continuous webs along different length paths of travel from the point at which the webs are separated from the continuous single sheet to the pressure-applying means.

21. The apparatus according to claim 15, wherein the pressure-applying means includes opposed rolls providing a driving nip for the superimposed webs, one of said rolls having a different diameter than the other of said rolls to establish the desired tension on the superimposed webs when the opposed rolls are driven at the same rotational speed.

22. The apparatus according to claim 21, including heating means for heating the pressure-applying rolls.

23. The apparatus according to claim 19, wherein the pressure-applying means includes opposed rolls providing a driving nip for the superimposed webs, one of said rolls having a different diameter than the other of said rolls to establish the desired tension on superimposed webs when the opposed rolls are driven at the same rotational speed.

24. The apparatus according to claim 20, wherein the pressure-applying means includes opposed rolls providing a driving nip for the superimposed webs, one of said rolls having a different diameter than the other of said rolls to establish the desired tension on the superimposed webs when the opposed rolls are driven at the same rotational speed.

25. An apparatus for continuously forming catch-covers of the type including a back panel, a front panel and a catch strip for retaining the front panel in a closed position overlying the back panel, said apparatus comprising:
  a. guide means for continuously directing first, second and third continuous webs into a position in which the first web is superimposed with the second web, and the third web partially overlaps the second web and also is superimposed with the first web;
  b. feed means for delivering flexible commodity-containing packages between the continuous webs with the first continuous web positioned on one side of the packages and the second and third webs positioned on the opposite side of said packages;
  c. pressure-applying means for pressing the first and second webs together and the first and third webs together to connect the superimposed webs together adjacent marginal ends thereof to form a composite, said pressure-applying means being effective for connecting the packages to at least two superimposed webs positioned on opposite sides of said packages; and
  d. severing means for separating the composite into discrete sections to form a plurality of discrete packages, each package being joined to a catch-cover that includes a back panel formed from a section of the first web, a front panel formed from a section of the second web and a catch strip formed from a section of the third web.

26. The apparatus according to claim 25, including cutting means upstream of the guide means for separating a continuous single sheet into the three continuous webs.

27. The apparatus according to claim 25, wherein said guide means includes web-diverting surfaces for directing the three continuous webs in non-mirror image paths to the pressure-applying means.

28. The apparatus according to claim 26, wherein said guide means includes web-diverting surfaces for directing the continuous webs severed from the single sheet in non-mirror image paths from the point where the single sheet is cut to form the webs to the pressure-applying means.

29. The apparatus according to claim 25, wherein said guide means includes web-diverting surfaces for directing the continuous webs along different length paths of travel to the pressure-applying means.

30. The apparatus according to claim 26, wherein said guide means includes web-diverting surfaces for directing the continuous webs along different length paths of travel from the point at which the webs are separated from the continuous single sheet to the pressure-applying means.

31. The apparatus according to claim 25, wherein the pressure-applying means includes opposed rolls providing a driving nip for the superimposed webs, one of said rolls having a different diameter than the other of said rolls to establish the desired tension on the superimposed webs when the opposed rolls are driven at the same rotational speed.

32. The apparatus according to claim 26, wherein the pressure-applying means includes opposed rolls providing a driving nip for the superimposed webs, one of said rolls having a different diameter than the other of said rolls to establish the desired tension on the superimposed webs when the opposed rolls are driven at the same rotational speed.

33. The apparatus according to claim 28, wherein the pressure-applying means includes opposed rolls providing a driving nip for the superimposed webs, one of said rolls having a different diameter than the other of said rolls to establish the desired tension on the superimposed webs when the opposed rolls are driven at the same rotational speed.

34. The apparatus according to claim 30, wherein the pressure-applying means includes opposed rolls providing a driving nip for the superimposed webs, one of said rolls having a different diameter than the other of said rolls to establish the desired tension on the superimposed webs when the opposed rolls are driven at the same rotational speed.

35. The apparatus according to claim 25, wherein said guide means includes adjustable web-diverting surfaces for permitting adjustment of the cross-machine-direction position of superimposed webs relative to each other.

36. The apparatus according to claim 25, wherein said guide means includes adjustable web-diverting surfaces for permitting adjustment of both the cross-machine-direction position and the machine-direction position of the superimposed webs relative to each other.

37. An apparatus for continuously forming catch-covers of the type including a back panel, a front panel and a catch strip for retaining the front panel in a closed position overlying the back panel, said apparatus comprising:
  a. guide means for continuously directing first, second and third continuous webs into a position in which the first web is superimposed with the second web, and the third web partially overlaps the second web and also is superimposed with the first web;
  b. pressure-applying means for pressing the first and second webs together and the first and third webs together to connect the first and second webs, and the first and third webs adjacent marginal ends thereof to form a composite, said pressure-applying means including opposed rolls providing a driving nip for the superimposed webs, one of said rolls having a different diameter than the other of said rolls to establish the desired tension on the superimposed webs when the opposed rolls are driven at the same rotational speed, and c. severing means for separating the composite into discrete sections to form separate catch-covers, each of said covers including a back panel formed from a section of the first web, a front panel formed from a section of the second web and a catch strip formed from a section of the third web.

38. The apparatus according to claim 37, wherein said guide means includes adjustable web-diverting surfaces for permitting adjustment of the cross-machine-direction position of superimposed webs relative to each other.

39. The apparatus according to claim 37, wherein said guide means includes adjustable web-diverting surfaces for permitting adjustment of both the cross-machine-direction position and the machine-direction position of the superimposed webs relative to each other.

* * * * *